Figure 1:
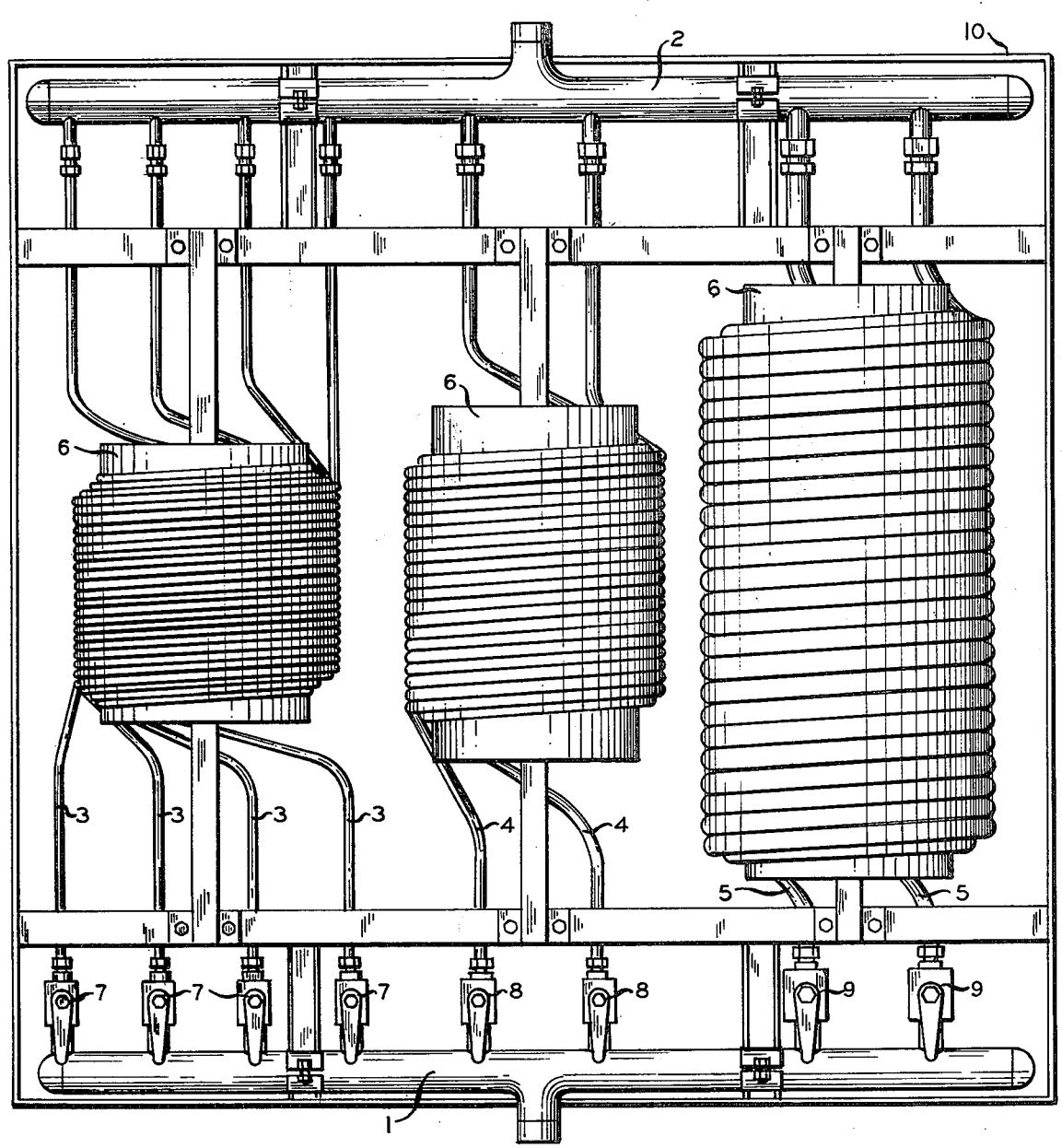

United States Patent [19]

Jackson

[11] 4,276,904
[45] Jul. 7, 1981

[54] ADJUSTABLE FLOW RATE CONTROLLER FOR POLYMER SOLUTIONS

[75] Inventor: Kenneth M. Jackson, Bartlesville, Okla.

[73] Assignee: The United States of America as represented by the United States Department of Energy, Washington, D.C.

[21] Appl. No.: 719,869

[22] Filed: Sep. 1, 1976

[51] Int. Cl.³ .............................................. G05D 7/00
[52] U.S. Cl. ................................................... 137/599
[58] Field of Search .............. 137/14, 599; 166/305 R

[56] References Cited

U.S. PATENT DOCUMENTS

| 2,150,077 | 3/1939 | Oehler | 137/599 |
|---|---|---|---|
| 2,163,591 | 6/1939 | Deverall | 137/599 X |
| 2,229,903 | 1/1941 | Schmol et al. | 137/599 |
| 3,010,316 | 11/1961 | Snyder | 137/599 X |
| 3,282,337 | 11/1966 | Pye | 166/9 |
| 3,286,510 | 11/1966 | Parker | 73/53 |
| 3,451,404 | 6/1969 | Self | 137/14 |
| 3,477,467 | 11/1969 | Sewell et al. | 137/599 |
| 3,827,457 | 8/1974 | Vutz | 137/599 |
| 3,879,984 | 4/1975 | Welland | 137/110 X |
| 3,905,394 | 9/1975 | Jerde | 137/599 |

OTHER PUBLICATIONS

H. L. Bilhartz, Jr., et al., "Field Polymer Stability Studies", Paper No. Spe 5551, copyright 1975, American Institute of Mining, Inc.
Dow Chemical Company Brochure, "Pusher Chemicals for Secondary Oil Recovery", copyright 1968.

Primary Examiner—Robert G. Nilson
Attorney, Agent, or Firm—E. L. Bowman; Roger S. Gaither; Richard G. Besha

[57] ABSTRACT

An adjustable device for controlling the flow rate of polymer solutions which results in only little shearing of the polymer molecules, said device comprising an inlet manifold, an outlet manifold, a plurality of tubes capable of providing communication between said inlet and outlet manifolds, said tubes each having an internal diameter that is smaller than that of the inlet manifold and large enough to insure that viscosity of the polymer solution passing through each said tube will not be reduced more than about 25 percent, and a valve associated with each tube, said valve being capable of opening or closing communication in that tube between the inlet and outlet manifolds, each said valve when fully open having a diameter that is substantially at least as great as that of the tube with which it is associated.

11 Claims, 1 Drawing Figure

ADJUSTABLE FLOW RATE CONTROLLER FOR POLYMER SOLUTIONS

BACKGROUND OF THE INVENTION

This invention relates to controlling the rate of flow of polymer solutions. In one aspect the invention relates to equipment employed in connection with the injection of polymer solutions into wellheads. In another aspect this invention relates to a device which will allow one to control the rate at which a polymer solution is injected into a wellhead with a minimum adverse effect upon the polymer viscosity.

In the injection of polymer solutions employed in waterflood operations it is often necessary to exert some control over the rate of flow of the polymer solution into the wellhead. In certain situations it is also advantageous to be able to quickly change the rate at which the polymer solution is injected into the wellhead. A commonly used method of controlling the flow rate of fluids pumped into a wellhead involves controlling flow by use of a globe type valve. In the injection of certain polymer solutions, e.g., aqueous polyacrylamide solutions, the sudden pressure drop across the orifice provided by the setting on a globe valve causes the polymer to break up. When the polymer breaks up the solution becomes less viscous. H. L. Bildartz and G. S. Carlson in "Field Polymer Stability Studies", SPE Paper 5551 (1975) have shown that the shear degradation of polymer in conventional injection wellheads results in viscosity reductions of 26 to 41 percent and screen factor reduction of 13 to 54 percent. When using a globe valve to control the flow of such a polymer solution, more polymer must be employed to insure a specific solution viscosity. Employing additional polymer to compensate for polymer destruction is, of course, not economically desirable.

A conventional method for reducing the flow rate of a shearable polymer with a minimum of polymer deterioration involves the employment of a device known as a "choke coil". A typical example of "choke coil" involves three parallel 50-foot lengths of 5/16" copper tubing wound around a mandrel so that the complete assembly is only about 6"×18" overall. Such a "choke coil" is capable of passing 880 bbl. of water per day with an input pressure of 1350 psi and an output pressure of 950 psi. If such a 400 psi pressure drop were provided by employing a globe valve or other variable orifice the polymer would be subjected to undesirable shearing. Generally when employing shearable polyacrylamide solutions abrupt pressure drops greater than 25 psi produces an undesirable amount of polymer shear. When a pressure drop of 400 psi is spread over the 50-foot length of the tubes in the "choke coil" the damage to the polymer molecules is minimal.

A shortcoming of such "choke coil" devices is the absence of a means of adjustment which would allow an operator to quickly and simply alter the amount of pressure drop provided by the device. When for some reason it has been necessary to change the amount of restriction of flow, operators have had to disconnect the "choke coil" from the injection line and either shorten or lengthen the coils in the device since each "choke coil" is designed to provide a particular set of flow conditions.

There are various situations where it is desirable to be able to vary the flow rate of the polymer solution more quickly and conveniently than can be done with a conventional "choke coil". For example, as polymer injection progresses the wellhead pressure can approach the formation fracture point. In order to prevent undesired fracturing it becomes necessary to reduce the flow rate of the polymer solution. Also, in waterflooding, it is recognized to be economically advantageous to inject polymer solution in the form of "slugs" of decreasing concentration. In order to insure certain flow rates the restriction of polymer flow must be varied as the polymer concentration is changed.

In response to the lack of adjustability of "choke coils", a flow rate controller for degradable polymer solutions, called a "packed column regulator", has been developed. The "packed column regulator" consists essentially of a vertical section of pipe packed with sand or glass beads. The flow through the device is regulated by changing the amount of sand or beads in the column. It should be evident that even with the "packed column regulator" a significant amount of alteration of the device and experimentation is required to obtain the desired flow rate of polymer solution. Thus there has been a need in this field for a device which can be quickly and easily adjusted to modify the flow rate of polymer injection solutions while producing a minimum of polymer degradation.

SUMMARY OF THE INVENTION

Accordingly, it is the object of the present invention to provide a device which can be employed to vary the flow rate of shear degradable polymer solutions.

A further object of the present invention is to provide a flow rate controller which will not cause an undesirable amount of degradation of shear degradable polymer injection solutions.

Other objects and advantages of the present invention will be apparent from the following specification and claims and from the appended drawing which delineates by way of an illustrative example one embodiment of the present invention.

In accordance with the present invention a device for controlling the flow rate of polymer solutions comprises (1) an inlet manifold, (2) an outlet manifold, (3) a plurality of tubes capable of providing communication between the inlet and outlet manifolds, wherein the internal diameter of each said tube is smaller than the internal diameter of the inlet manifold and large enough to insure that the viscosity of the polymer solution passing through the tube will not be reduced more than about 25 percent, and (4) a valve associated with each tube in such a manner as to be capable of opening or closing communication in that tube between the inlet and outlet manifolds, wherein each valve when open has an internal diameter that is substantially at least as great as the internal diameter of the tube with which it is associated.

The inlet and outlet manifolds can be of any suitable size. Generally it is convenient if they are constructed of the same diameter pipe that is employed in conveying the polymer solution to the flow rate controller and from the flow rate controller to the wellhead. The most commonly used pipe for such applications is the common 2-inch outside diameter pipe. Of course, as indicated above the manifolds must have a larger internal diameter than any of the tubes employed in the device. The inlet manifold includes an inlet which can be attached to a supply of polymer solution under pressure. Likewise the outlet manifold includes an outlet which can be employed to provide communication between the flow control device and the wellhead.

Within the aforedescribed cross-sectional limitations, the tubes can be of any desired length or cross section. Once one determines the pressure at which the polymer solution is supplied to the inventive device and the various flow rates that are desired the length and diamter for each of the tubes can be selected by considering the flow characteristics of the conventionally used polymer solutions in tubes of various diameters. Thus the various tubes in the device can be of the same or different lengths. Also the various tubes can have the same or different internal cross section dimension. A greater amount of adjustability is provided with the device if the length, internal diameter, or length and internal diameter of at least one of the plurality of tubes differs from that of at least one other of the plurality of tubes in such a fashion that the resistance to flow across the length of at least one tube will be different from that of the at least one other of the plurality of tubes. Preferably each tube has a length in the range of about 10 feet to about 200 feet and an internal diameter in the range of about 0.25 inch to about 1 inch.

The number of tubes employed is two or more. Greater numbers of tubes, of course, provide correspondingly greater numbers of different possible flow rates. The upper limit on the number of tubes can be determined by such practical considerations as the likelihood that additional flow rates will be required.

Although straight lengths of tubing can be employed, it has been found advantageous to coil a predominate amount of the length of each of the tubes. Coiling the tubes results in reducing the overall space required by the tubes. Further the friction factor in coiled tubes is greater than that of straight tubes, and therefore the length of coiled tubing required to produce a certain resistance to flow is less than that of a straight tube of the same internal diameter. It is preferred that the tubes not be bent to cause any sharp turns, e.g., 90° turns, as this would in some cases tend to cause additional undesirable shearing of the polymer in the injection solution.

The valve associated with each tube can be of any type which when open has an internal diameter that is not substantially smaller than that of the tube with which it is associated. That is, it is essential that the open valve have an internal diameter substantially at least as great as the internal diameter of the tube with which it is associated. Suitably sized ball valves are an example. The valves can be placed at either end of the tubes, viz the ends that are connected to the inlet manifold or the ends that are connected to the outlet manifold. Alternatively the valves can be placed at some point along the length of the tubes that is not adjacent the inlet or outlet manifolds. A preferred embodiment of the present invention involves placing the valves at the end of the tubes that are connected to the inlet manifold. This arrangement helps to minimize the possibility that fluid might freeze in the tubes when the flow rate controller is utilized in cold weather.

It will of course be necessary that the tubing, manifolds and valves be constructed of materials that will withstand the operating pressures to which the device is normally exposed. The connection between the tubes and manifold, manifold and valves, and tubes and valves, as required can be provided by any suitable means.

Further understanding of the present invention will be provided by referring to FIG. 1 which shows a top view of a specific embodiment of the present invention. The device has an inlet manifold 1 and an outlet manifold 2, each constructed of 2-inch schedule 80 carbon steel pipe. Communication between the inlet manifold and the outlet manifold is provided by four 100-foot long, $\frac{3}{8}$-inch O.D. tubes, each denoted in the drawing by the numeral 3, two 100-foot long, $\frac{1}{2}$-inch O.D. tubes, each denoted in the drawing by the numeral 4, and two 100-foot long, $\frac{3}{4}$-inch O.D. tubes, each denoted in the drawing by the numeral 5. The tubes each have a wall thickness of 0.035 inch. Thus the internal diameters of the three different sizes of tubing are 0.31 inch, 0.43 inch, and 0.68 inch. Each of the tubes having the same diameter are coiled one upon the other around supporting mandrels 6 each having a diameter or about 1 foot. In the device illustrated each of the tubes 3, 4, and 5 is connected to the inlet manifold by suitably connected Worchester #444T ball valves 7, 8, and 9 having an I.D. substantially the same as the I.D. of the tubing. In the illustrated device the manifolds 1 and 2 and the mandrel 6 are attached to a suitable frame structure 10 so that the device can be readily transported.

The drawing and the foregoing description of the drawing have been provided to illustrate one embodiment of the present invention. Devices differing from the one shown in the drawing are within the scope of the present invention. Also various modifications can be made in the various features of the device shown without departing from the scope of the present invention. For example, the inlet and outlet portions of the inlet and outlet manifolds would not necessarily have to be near the center of the respective manifold as shown in the drawing. The inlet and/or outlet each could be located at or adjacent one end of the respective inlet and outlet manifold. In the inlet and/or outlet of each manifold is located at or near one end of the respective manifolds it then becomes possible to have various connection arrangements for the tubes relative to the inlets and outlets. For example, the manifolds can be arranged so that the tubes connected closest to the inlet of the inlet manifold are connected farthest away from the outlet of the outlet manifold and so that the tubes connected farthest away from the inlet manifold are connected closest to the oulet manifold.

A still better appreciation of the present invention will follow from a description of the method by which the inventive device can be employed in polymer injection. The inlet manifold is connected to a source of polymer solution e.g., the inlet manifold is connected to pipe conveying polymer solution as it is pumped from a conventional mixing device or other source. The outlet manifold is connected to the wellhead by suitable means, e.g., piping. A flow meter is connected so that the flow rate of polymer solution to the well can be measured. With all valves positioned in the full open position the flow through the flow rate controller will be at a maximum. To reduce the flow rate one merely has to fully close one or more of the valves associated with the tubes. Note that it is essential that the valves themselves not be employed to restrain the flow by setting the valves at some point between fully opened and fully closed. In utilizing the present device each valve is always positioned in either the fully opened or fully closed position except for the time required to change it from one such position to the other position. By thus changing the position of the various valves one can obtain a flow rate substantially as desired. One can easily determine the correct positioning of the valves required to approximate a desired flow rate by experimenting with available open-close valve settings while watching the flow meter. With experience, an operator will learn which set of open-closed valve positions will provide the degree of change necessary to approximate a desired flow rate. Alternatively, one can empirically develop nomographs which set forth for particular polymer solutions the pressure drop for various open-close valve settings. Such nomographs can be used to guide the operator in choosing the open-closed valve settings that will most closely provide a flow rate conforming to the desired flow rate. Since polymer solutions of different concentrations behave differently, to be absolutely certain about optimum valve settings for a particular flow rate it would be necessary to develop nomographs for each polymer solution that was to be employed. It is generally sufficient for the operator to merely try valve positions that will provide more or less restriction to flow, viz. to open or close tubes until a change is obtained that is satisfactory. The presence of eight tubes enables one to produce a wide range of pressure drops with the device.

The following examples are provided to further illustrate the present invention.

EXAMPLE I

Using a device like that shown in the drawing, except that the valves were adjacent the outlet manifold rather than the inlet manifold, nomographs were developed for aqueous solutions of Betz Hi-Vis polyacrylamide of concentrations of 2100 ppm and 340 ppm.

If a wellhead pressure is about 50 psig and the injection system pressure is about 400 psig, and it is desired to pump about 400 bbl/day of 2100 ppm Betz Hi-Vis aqueous polymer solution, the injection system pressure would have to be throttled down to 50 psig. The nomograph for such a polymer solution indicates that a 350 psig pressure drop can be provided to produce a flow rate of 400 barrels/day by opening the two ⅜-inch ball valves and closing all the others.

If instead a wellhead pressure is 340 psig and the injection system is 400 psig and it is desired to inject a 340 ppm Betz Hi-Vis solution at 300 bbl/day, the injection pressure would have to be throttled down to 340 psig. The nomograph for a 340 ppm Betz Hi-Vis solution indicates that the needed 60 psig pressure drop will be provided if one ¾-inch ball valve is opened and all remaining valves are closed.

EXAMPLE II

Again using a device like that shown in the drawing, except that the valves were adjacent the outlet manifold rather than the inlet manifold, a series of tests were conducted to evaluate polymer shear degradation of various solutions of Betz Hi-Vis polyacrylamide of concentrations varying from 340 ppm to 2130 ppm. The various solutions of Betz Hi-Vis polyacrylamide were prepared in Ark Burbank river water. The polymer solutions were hydrolyzed for 35 minutes before flowing through the flow rate control in order to simulate field injection lag time. No nitrogen blanket or oxygen inhibitor was used to protect the polymer solutions from chemical degradation. The various polymer solutions were passed through the flow rate control device with the valves positioned in several of the 32 available open-closed settings to provide pressure drops across the device varying from about 10 psi to about 300 psi.

Polymer samples were taken immediately upstream and downstream of the flow rate controller using sample vessels designed to extract polymer solution samples with minimum shear degradation. The degree of polymer shear was determined by determining the percent loss in polymer solution viscosity and the percent loss in screen factor. The screen factor gives an indication of the relative flow resistance that a polymer solution will provide in a given core. The screen factor was determined by measuring the time required for a fixed volume of sampled polymer solution to flow through five layers of 100 mesh screen and dividing this by the time required by distilled water to likewise flow through five such layers of wire mesh.

In some cases viscosity increases were observed. Those results were most probably the result of an improper use of the upstream polymer solution samples which resulted in shear degradation during sampling. The average percent viscosity loss of the polymer solutions flowing through the flow rate controller was 7.68 percent. Of the samples that were not shear degraded by improper extraction from the polymer solution samples 83.3 percent loss less than 10 percent in viscosity.

When all results showing negative percent loss values were ignored, the average percent reduction in screen factor value was 11 percent. Of the samples not shear degraded by improper use of the polymer solution samples 83.3 percent lost less than 17 percent in screen value.

These tests establish that the present inventive flow rate controller can be employed to vary the flow of shear degradable polymer solutions with a minimum amount of polymer degradation.

What is claimed is:

1. An adjustable device suitable for controlling the flow rate of a polymer solution comprising
    (1) an inlet manifold having an inlet,
    (2) an outlet manifold having an outlet,
    (3) a plurality of tubes each connected to the inlet and outlet manifolds so that polymer solution flowing into the inlet manifold can flow through the tubes into the outlet manifold, wherein each tube has an internal diameter that is smaller than the internal diameter of the inlet manifold while being large enough that the viscosity of the polymer solution passing through the tube will not be reduced more than about 25 percent, and
    (4) a valve associated with each tube, wherein each said valve is capable of both allowing or preventing flow of polymer solution from the inlet manifold to the outlet manifold through said tube and wherein each said valve when fully opened has an internal diameter that is substantially at least as great as that of the tube with which it is associated.

2. An adjustable device suitable for controlling the flow rate of a polymer solution comprising
    (1) an inlet manifold having an inlet,
    (2) an outlet manifold having an outlet,
    (3) a plurality of tubes each connected to the inlet and outlet manifolds so that polymer solution flowing into the inlet manifold can flow through the tubes into the outlet manifold, wherein each tube has an internal diameter that is smaller than the internal diameter of the inlet manifold and in the range of about 0.25 inch to about 1 inch, and
    (4) a valve associated with each tube, each said valve being capable of both allowing or preventing flow of polymer solution from the inlet manifold to the outlet manifold through said tube and each said valve when open having an internal diameter that is substantially at least as great as that of the tube with which it is associated.

3. A device according to claim 2 wherein the length, internal diameter, or length and internal diameter of at least one of the plurality of tubes differs from that of at least one other of the plurality of tubes in such a fashion that the flow resistance across said at least one tube will be different from that of the at least one other of the plurality of tubes.

4. A device according to claim 3 wherein each tube of said plurality of tubes has a predominant amount of its length formed into a coil.

5. A device according to claim 4 wherein each tube of said plurality of tubes has a length in the range of about 10 feet (3.048 meters) to about 200 feet (60.96 meters).

6. A device according to claim 5 wherein the plurality of tubes consists of eight tubes of equal length, four of which have an internal diameter of about 0.31 inch (0.79 cm), two of which have an internal diameter of about 0.43 inch (1.09 cm), and two of which have an internal diameter of about 0.68 inch (1.7 cm).

7. A device according to claim 6 wherein the four tubes having the same internal diameter are coiled one upon another, the tubes having an internal diameter of about 0.43 inch are coiled one upon the other, and the tubes having an internal diameter of about 0.68 inch are coiled one upon the other.

8. A device according to claim 7 wherein each of the eight tubes if uncoiled would be about 100 feet (30.48 meters) in length and wherein each valve is a ball valve located between the inlet manifold and the respective tube.

9. A device according to claim 8 wherein the internal diameter of the innermost coil in each of the three groups of coiled tubing is about 1 foot (25.4 cm) and each of the three groups of coiled tubing is wrapped around a respective supporting mandrel.

10. A device according to claim 2 wherein each valve is a ball valve located between the inlet manifold and the respective tube.

11. A device according to claim 10 wherein each tube of said plurality of tubes has a length in the range of about 10 feet (3.048 meters) to about 200 feet (60.96 meters).

* * * * *